United States Patent Office 3,269,917
Patented August 30, 1966

3,269,917
PROCESS FOR PRODUCING PURINE-NUCLEOSIDES
Akira Imada, Nishinomiya, and Seizi Igarasi, Ashiya, Japan, assignors to Takeda Chemical Industries, Ltd., Osaka, Japan
No Drawing. Filed Mar. 16, 1964, Ser. No. 352,332
Claims priority, application Japan, Mar. 18, 1963, 38/14,634, 38/14,635
13 Claims. (Cl. 195—28)

This invention relates to a process for producing purine-nucleosides which do not naturally occur. More precisely, the invention relates to a novel method for producing purine-nucleosides represented by the formula:

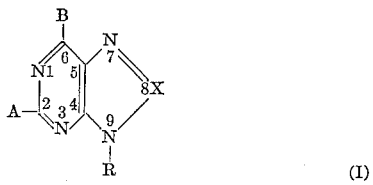

(I)

wherein A stands for H, —OH or —NH₂, B stands for H, a halogen, —SH, —NH₂, —NH-(lower alkyl),

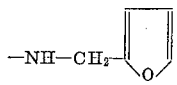

or —NH-(acyl), X stands for CH or N, and R stands for a pentosyl such as ribosyl or deoxyribosyl, with the proviso that X is not CH when A and B are H and NH₂, respectively; the lower alkyl having up to six carbon atoms, and the acyl being a lower carboxylic acyl having up to seven carbon atoms. The objective purine-nucleosides include, for example, purine riboside, 6-mercaptopurine riboside, 2-aminopurine riboside, 2,6-diaminopurine riboside, kinetin riboside (i.e. 6-furfurylaminopurine riboside), 6-methylaminopurine riboside, isoguanine riboside, 6-chloropurine riboside, 6-iodopurine riboside, 8-azaguanine riboside, 6-mercapto-8-azapurine riboside and their corresponding deoxyribosides. In this specification, these objective purine-nucleosides are referred to as "naturally not-occurring (or non-existing) purine-nucleosides," since they do not occur in the natural fields in a large amount, for example, as constitutents of nucleic acids.

It is well known that said naturally not-occurring purine-nucleosides are useful and valuable as chemical or biochemical agents in enzymic and biochemical studies. While naturally occurring purine-nucleosides such as adenosine, guanosine, xanthosine and inosine are easily prepared, for example, by the hydrolysis of ribonucleic acids or deoxyribonucleic acids to yield a mixture of nucleosides and separating each therefrom with or without treatment for deamination, or by dephosphorylation of purine-nucleosides by means of phosphatase, the naturally not-occurring purine-nucleosides as exemplified above cannot be produced from nucleic acids and must depend on chemical syntheses which require many steps of reaction procedures and strict control of reaction conditions. No hitherto-known chemical means for the production of such nucleosides has been free from difficulties in allowing the reaction to take place at the desired positions of the base and of the ribose or deoxyribose and in handling labile ribose or more labile deoxyribose. Especially, no desirable synthetic course to produce purine-deoxyribonucleosides industrially has been established or presented as far as the present inventors know.

It was found by the present inventors that many aerobic bacteria produce enzyme systems capable of transferring a ribosyl or deoxyribosyl group of a nucleoside into the ninth position of a purine base to give a purine nucleoside, the base of which corresponds to the purine base used. It was also found that the ribosyl or deoxyribosyl-transferring enzyme systems likely include at least a kind of phosphorylase, because the presence of a phosphate is necessary for the action of the enzyme systems.

The present invention was accomplished on the basis of said findings, and, according to this invention, said naturally not-occurring purine-nucleosides, especially purine-deoxyribonucleosides, are easily producible under enzymic mild conditions in an industrial scale.

The principal object of the present invention is to provide a novel process for producing a desired naturally not-occurring purine-nucleoside of the general Formula I from the corresponding purine base by the action of said enzyme system of aerobic bacteria.

Another object of the invention is to provide a means for utilization of nucleosides or nulceotides which are obtainable abundantly and inexpensively as ribosyl or deoxyribosyl donor, i.e. pentosyl group donor, for synthesizing the desired valuable nucleosides.

It is another object, although rather specific, to provide an industrial method for producing the purine-deoxyribonucleosides which do not occur naturally, and which were difficult to be produced in an industrial scale by hitherto-known methods.

One of the starting materials in the process of this invention is a nucleoside or nucleotide as a donor of ribosyl or deoxyribosyl group. Practically, naturally occurring nucleosides or naturally occurring nucleotides are easily produced by the hydrolysis of nucleic acids. While some purine 5'-nucleotides are utilized as condiments for example, pyrimidine-nucleotides are far from receiving so deep concern as found in valuable purine-nucleotides, and these less valuable pyrimidine-nucleotides are of course usable as good starting material in the present invention. More concretely, the starting materials as a ribosyl group donor may include, for example, ribonucleosides (such as adenosine, inosine, guanosine, uridine and cytidine) and 2'-, 3'-, 5'-, 2',3'- or 3',5'-ribonucleotides corresponding to said ribonucleosides; while the starting material as a deoxyribosyl group donor may include, for example, deoxyribonucleosides (such as adenine deoxyriboside, hypoxanthine, deoxyriboside, guanine deoxyriboside, cytosine deoxyriboside, and thymine deoxyribose) and 3'-, 5'- or 3',5'-deoxyribonucleotides corresponding to said deoxyribonucleosides. These nucleosides and/or nucleotides may of course be a mixture and need not be pure.

Another starting material is the purine base which corresponds to the base part of the desired purine nucleoside and to which a ribosyl or deoxyribosyl group is transferred. This purine base is shown by the general formula:

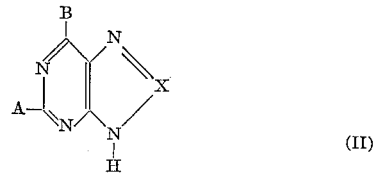

(II)

wherein A, B and X stand for the same meanings as in Formula I, and the purine base may be exemplified by purine, 2,6-diaminopurine, 2-aminopurine, 6-mercaptopurine, 6-chloropurine, 6-iodopurine, benzoyladenine, 2-amino-6-acetylaminopurine, isoguanine, kinetin, 6-methylaminopurine, 6-ethylaminopurine, 6-isopropylaminopurine, 6-hexylaminopurine, 8-azaguanine, 6-mercapto-8-azapurine and 6-butyroylamino-8-azapurine.

The aerobic bacteria capable of producing the desired enzyme system exist widely regardless of the classification, for eaxmple, in the genera Aerobacter, Aeromonas, Bacillus, Bacterium, Corynebacterium, Erwinia, Escherichia, Proteus, Pseudomonas, Salmonella, Serratia and Vibrio, and preferred species for the purpose include, for example, the following bacteria:

Aerobactor aerogenes (Kruse) Beijerinck;
Aeromonas hydrophila (Chester) Stanier;
Bacillus brevis Migula emend. Ford;
Bacillus megaterium de Bary;
Bacillus sphaericus Neide;
Bacillus subtilis Cohn emend. Prazmowski;
Bacterium cadaveris Gale et Epps;
Corynebacterium sepedonicum (Spiek. et Kott.) Skaptason et Burkholder;
Erwinia aroideae (Townsend) Holland;
Escherichia coli var. communior (Topley et Wilson) Yale;
Proteus vulgaris Hauser;
Salmonella enteritidis (Gaertner) Castellani et Chalmers;
Serratia marcescens Bizio;
Pseudomonas putrefaciens (Derby et Hammer) Long et Hammer; and
Vibrio percolans Mudd et Warren.

In the process of this invention, culture broth of said bacteria may directly be employed as the enzyme source, or the cells may be used as suspended in water, a buffer solution or a saline solution. The collected cells may further be subjected prior to the reaction to such a pretreatment as disruption by sonication, grinding with glass beads, treating cells with a cell-injuring agent such as phenol, sodium deoxycholate and so on, or washing with an organic solvent e.g. acetone or ethyl acetate. The process of the present invention can be effected also by cultivating said aerobic bacteria in a suitable culture medium containing both starting materials under aerobic conditions.

Incubation of the bacteria is carried out in a suitable culture medium under aerobic conditions. The culture medium should contain assimilable carbon sources and utilizable nitrogen sources for the bacteria used, and it is desirable that the medium be supplemented with inorganic salts and trace elements. The nutrients usable for the incubation are those generally employed for the incubation of bacteria. Thus, the carbon sources include, for example, starch, soluble starch, dextrin, glucose, sucrose, lactose, maltose, and glycerol; the nitrogen sources contain, for example, peptone, meat extracts, yeast extracts, soybean meal, corn steep liquor, gluten, sodium glutamate, urea, ammonium salts (e.g. ammonium chloride, ammonium sulfate, ammonium nitrate, ammonium lactate) and nitrates (e.g. sodium nitrate, potassium nitrate). Other inorganic salts may for example be potassium phosphate, magnesium sulfate, sodium chloride, and calcium chloride. Traces of such nutritional elements as boric acid, copper sulfate, ferric chloride, maganese sulfate, sodium molybdate and zinc sulfate may be used.

The conditions under which the aerobic bacteria are incubated are advantageously correlated to the species of the bacteria used and/or the culture medium. Usually, the incubation is carrier out at a temperature from 20 to 40° C. for one to six days with a preferable result.

In the process of the present invention, a desirable purine base represented by the general Formula II on one hand and one or more nucleosides and/or nucleotides as a ribosyl or deoxyribosyl donor on the other hand are brought into contact with the bacterial cells or the enzyme system produced therefrom. In this reaction, a preferable pH for the medium ranges about from 4 to 10, but in some cases pH 5.0 to 8.0 may be required. The temperature is usually selected from the range of about 20 to 50° C.

It may be emphasized that the presence of a phosphate is required for the pentosyl-transferring reaction. However, in some cases, for example, when the enzyme source is contaminated with the phosphate or when some nucleotides are used as the pentosyl donor together with phosphomonoesterase or pyrophosphatase, the addition of phosphate is unnecessary. The desirable concentration of phosphate in the reaction mixture ranges from 0.1 to 100 millimoles, but too much excess of the phosphate may act adversely on the production of the desired purine pentosides.

The objective purine nucleosides thus accumulated in the reaction medium are recovered or isolated after any of per se known means for separating the product of enzymic reaction from the enzymic reaction mixture or for separating a plurality of similar chemical compounds into the individual compounds. For example, the separation can be effected by utilizing a differences in the solubilities in various solvents between the objective compound and the impurities, the difference in their distribution coefficients between the two solvent layers, the difference in their adsorbabilities on an adsorbent such as activated charcoal and ion-exchange resins, the difference in their dialyzabilities through a semi-permeable membrane, or the difference in their crystallizabilities from a solvent, as well as filtration or centrifugation of the reaction mixture with or without addition of a filter aid. In practice, these means for separation or isolation are carried out in combination or repeatedly depending on the desired purity and state of the products.

The invention will now be described in further particularity by means of the following examples. It will be understood, of course, that the invention is not limited to the particular details of these examples since they only set forth presently preferred exemplary embodiments of the invention. In these examples, all percentages are on the weight basis and temperatures are in degrees centigrade. The abbreviations "l.," "ml.," "g.," "mg.," "M" and "mM." mean respectively liter(s), milliliter(s), gram(s), milligram(s), mole concentration and millimole concentration. The strains of aerobic bacteria employed in these examples have been maintained in American Type Culture Collection (ATCC), Washington, D.C., U.S.A.; Northern Utilization Research Branch, U.S. Dept. of Agriculture (NRRL), Peoria, Ill., U.S.A. or United States Department of Agriculture (USDA), bearing the accession numbers abbreviated as "ATCC-number," "NRRL-number" and "USDA-number," respectively.

*Example 1*

Aerobacter aerogenes (Kruse) Beijerinck (ATCC-9621) was cultivated at 28° overnight on a bouillon-agar slant containing 1% of glucose, and an ear-pick of the cells was then inoculated in an aqueous culture medium (40 ml. each) placed in twenty-five 200 ml.-conical flasks; the medium consisting of dextrin (20.0 g.) polypeptone (10.0 g.), meat extract (10.0 g.), dipotassium hydrogenphosphate (1.0 g.), sodium chloride (5.0 g.) and sterilized tap water (1 l.), and being adjusted to pH 7.2. The inoculated medium was incubated at 28° for two days under shaking. After the incubation, the whole culture broth was centrifuged to collect cells. The cells were washed with 0.8% aqueous sodium chloride solution and suspended in distilled water (200 ml.) to prepare enzyme source.

A mixture consisting of 5 mM. aqueous solution (0.2 ml.) of a base illustrated in Table 1, 10 mM. aqueous solution (0.5 ml.) of 5′-thymidylic acid, 1.0 M acetate buffer solution (0.1 ml.) of pH 5.75, the above-prepared enzyme source (0.05 ml.) and water (0.15 ml.) was kept at 37° for 60 or 120 minutes, and the conversion rate in percentage of the bases into the corresponding nucleosides was measured to obtain the result shown in Table 1.

TABLE 1

| Base | Conversion rate (percent) | |
|---|---|---|
| | 60 minutes | 120 minutes |
| 2,6-diaminopurine | 68.2 | 74.2 |
| 6-mercaptopurine | 65.6 | 75.7 |
| Purine | 74.0 | 77.5 |
| 2-aminopurine | 68.9 | 76.0 |
| Benzoyladenine | 66.9 | 69.8 |
| Kinetin | 57.6 | 51.5 |
| 8-azaguanine | 7.6 | 10.6 |
| 8-azahypoxanthine | 9.3 | 10.0 |
| Benzotriazine | 16.7 | 34.8 |
| Benzimdazole | 22.2 | 25.0 |

*Example 2*

*Escherichia coli* var. *communior* (Topley et Wilson) Yale (ATCC–15389) was cultivated and treated in the same manner as in Example 1 to prepare the enzyme source.

A mixture consisting of 5 mM. aqueous solution (0.2 ml.) of a base illustrated in Table 2, 5 mM. aqueous solution (0.5 ml.) of 2'-deoxycytidine, 1.0 M acetate buffer solution (0.1 ml.) of pH 5.75 (containing 10 mM. potassium dihydrogenphosphate), the above-prepared enzyme source (0.1 ml.) and water (0.1 ml.) was kept at 37° for 60 or 120 minutes, and the conversion rate in percentage of the purine bases to the desired corresponding purine-nucleosides was measured to obtain the result shown in Table 2.

TABLE 2

| Base | Conversion rate (percent) | |
|---|---|---|
| | 60 minutes | 120 minutes |
| Purine | 58.0 | 60.9 |
| 2-aminopurine | 45.5 | 49.3 |
| 2,6-diaminopurine | 65.0 | 85.5 |
| 6-mercaptopurine | 44.0 | 66.4 |
| Kinetin | 70.0 | 89.6 |
| Benzoyladenine | 32.3 | 42.7 |
| 8-azaguanine | 10.1 | 14.2 |
| 8-azahypoxanthine | 12.1 | 15.0 |

*Example 3*

*Erwinia aroideae* (Townsend) Holland (ATCC–15390) was cultivated at 28° for two days on a bouillon-ager slant containing 1% of glucose, and about seven ear-picks of the cells were inoculated in an aqueous culture medium (250 ml.) placed in a 1 l.-conical flask, the medium having the same composition as used in Example 1. The incubation was carried out at 32° for three days under shaking. Then, to the culture broth were added kinetin and 5'-thymidylic acid so as to make the respective concentrations 5 mM. and 25 mM., the broth was adjusted to pH 6.2 with acetic acid. Further incubation was carried out at 32° for 3 hours, and the culture broth was centrifuged to remove solid matters.

The supernatant was adjusted to pH 4.5 with hydrochloric acid, and allowed to pass through a column packed with activated charcoal. After being washed with water, the charcoal column was eluted with 50% ethanol containing 1.4% of ammonia to obtain an eluate. The eluate was concentrated under reduced pressure, adjusted to pH 11 with aqueous ammonia, and allowed to pass through a column packed with quaternary strongly basic polystyrene ion exchange resin (formate-form). The column was then eluted with a formic acid-ammonia buffer solution of pH 8.2 to obtain an eluate. The eluate was freeze-dried to obtain 253 mg. of kinetin deoxyriboside.

*Example 4*

In the same manner as in Example 1, an enzyme source was prepared from *Aerobacter aerogenes* (Kruse) Beijerinck (ATCC–9621).

A mixture consisting of 25 mM. aqueous solution (40 ml.) of 6-mercaptopurine, 200 mM. aqueous solution (20 ml.) of 5'-thymidylic acid, 1 M acetate buffer solution (10 ml.) of pH 5.75 and the above-prepared enzyme source (30 ml.) was kept at 37° for three hours. After the reaction, the mixture was centrifuged to removed precipitates. The clear liquid was subjected, according to conventional means, to treatment with active charcoal and to anion-exchange resin chromatography, and was finally freeze-dried to give powdery 6-mercaptopurine deoxynucleoside. Yield 192 mg.

*Example 5*

In the same manner as in Example 2, an enzyme source was preprared from *Escherichia coli* var. *communior* (Topley et Wilson) Yale (ATCC–15389).

A mixture consisting of 50 mM. aqueous solution (40 ml.) of purine, 100 mM. aqueous solution (60 ml.) of thymidine, 1 M acetate buffer solution (20 ml.) of pH 5.75 (containing 10 mM. potassium dihydrogenphosphate) and the above-prepared enzyme source (40 ml.) was kept at 37° for three hours. After the reaction, the mixture was certifuged to remove precipitates. The clear liquid was treated in the same way as in Example 3 to obtain 325 mg. of purine deoxyriboside.

*Example 6*

The same reaction as in Example 4, except employing deoxy-5'-guanylic acid in place of 5'-thymidylic acid, afforded 170 mg. of 6-mercaptopurine deoxyriboside.

*Example 7*

The same reaction as in Example 5, except employing deoxyinosine in place of thymidine, afforded 350 mg. of purine deoxyriboside.

*Example 8*

*Vibrio percolans* Mudd et Warren (NRRL, S–31) was cultivated at 28° overnight on a bouillon-agar slant containing 1% of glucose, and the bacterial cells were inoculated in a culture medium (1 l.) having the same composition as used in Example 1. The inoculated bacteria were incubated at 28° for two days under shaking. After the incubation, the whole culture broth was centrifuged to collect cells. The cells were washed with 0.8% aqueous sodium chloride solution and suspended in distilled water (200 ml.) to prepare an enzyme source.

A mixture consisting of 20 mM.-aqueous solution (10 ml.) of 2-aminopurine or 2,6-diaminopurine, 50 mM.-aqueous solution (10 ml.) of thymidine, 0.5 M aqueous solution (2 ml.) of dipotassium hydrogenphosphate, 0.5 m-tris buffer solution (8 ml.) of pH 8.0 and the above-prepared enzyme source (10 ml.) was kept at 37° for 2 hours, whereupon 90% of 2-aminopurine or 82% of 2,6-diaminopurine was converted into the corresponding deoxyribonucleosides.

*Example 9*

*Erwinia aroideae* (Townsend) Holland (ATCC–15390) was cultivated at 28° for two days on a bouillon-agar slant containing 1% of glucose, and about seven ear-picks of the cultivated cells were inoculated in a culture medium (250 ml.) placed in a 1 l.-conical flask; the medium having the same composition as used in Example 1. The inoculated bacteria were incubated at 28° for four days under shaking. After the incubation, 200 ml. of the culture broth was centrifuged to collect cells. The cells were washed with 0.8% aqueous sodium chloride solution and suspended in distilled water (50 ml.) to prepare enzyme source.

A mixture consisting of 5 mM. aqueous solution (0.2 ml.) of a base illustrated in Table 3, 5 mM. aqueous solution (0.5 ml.) of inosine, 1 M acetate buffer solution (0.1 ml.) of pH 5.75 (containing 10 mM. potassium dihydrogenphosphate) and the above-prepared enzyme source (0.2 ml.) was kept at 37° for 60 or 120 minutes, and the conversion rate in percentage of the bases into the corresponding ribosides was measured to obtain the result shown in Table 3.

TABLE 3

| Base | Conversion rate (percent) | |
|---|---|---|
| | 60 minutes | 120 minutes |
| 2,6-diaminopurine | 62 | 90 |
| 6-mercaptopurine | 64 | 72 |
| Kinetin | 25 | 46 |
| Purine | 57 | 65 |
| 2-aminopurine | 49 | 54 |
| Benzoyladenine | 4 | 17 |

*Example 10*

In the same manner as in Example 1, an enzyme source was prepared from *Aerobacter aerogenes* (Kruse) Beijerinck (ATCC–9621).

A mixture consisting of 5 mM. aqueous solution (0.2 ml.) of the base illustrated in Table 4, 5 mM. aqueous solution (0.5 ml.) of guanosine, 1M acetate buffer solution (0.2 ml.) of pH 5.9 (containing 10 mM. potassium dihydrogenphosphate) and the above-prepared enzyme (0.1 ml.) was kept at 37° for 80 minutes, and the degree of the conversion of the bases to the corresponding ribosides was detected semiquantitatively by the technique of paper chromatography. The result is shown in Table 5.

TABLE 4

| Base | Degree* of conversion |
|---|---|
| 2,6-diaminopurine | +++ |
| 6-mercaptopurine | +++ |
| 8-azaguanine | + |
| Kinetin | +++ |
| 2-aminopurine | +++ |
| Purine | +++ |
| Benzoyladenine | ++ |

*Remark: The degree of conversion is expressed with +++ when the conversion took place up to the same degree as in the case of adenine into adenosine (the conversion rate was about 78%), and less degrees were expressed with ++ or + according to visual density of color under ultraviolet light on chromatogram.

*Example 11*

*Escherichia coli* var. *communior* (Topley et Wilson) Yale (ATCC–15389) was cultivated at 37° for two days on a bouillon-agar slant containing 1% of glucose, and an ear-pick of the cells was inoculated in a culture medium (20 ml.) placed in a 100 ml.-conical flask; the medium having the same composition as used in Example 1. The inoculated bacteria were incubated at 28° for four days under shaking. The resulting broth was used as an enzyme source.

To the broth (20 ml.) were added 6-mercaptopurine and inosine so as to make the final concentrations 5 mM. and 25 mM., respectively, and the mixture was shaken at 37° for 3 hours. After the incubation, the culture broth was centrifuged to remove cells, and the clear liquid was subjected, successively, to treatment with activated charcoal, chromatography on anion exchange resin and, finally, freeze-drying to obtain 15 mg. of powdery 6-mercaptopurine riboside.

*Example 12*

*Erwinia aroideae* (Townsend) Holland (ATCC–15390) was cultivated at 28° overnight on a bouillon-agar slant containing 1% of glucose, and an ear-pick of the cells was inoculated in a culture medium (250 ml.) placed in a 1 l.-conical flask; the medium having the same composition as used in Example 1. The incubation was carried out on a rotary shaker at 28° for four days. Then, 200 ml. of the culture broth was centrifuged to collect cells. The cells collected were washed with 0.8% aqueous sodium chloride solution and suspended in distilled water (50 ml.) to prepare an enzyme source.

A mixture consisting of 5 mM. aqueous solution (30 ml.) of 2,6-diamonopurine, 10 mM. aqueous solution (10 ml.) of 5′-cytidylic acid, 10 mM. aqueous solution (10 ml.) of 5′-uridylic acid, 0.2 M. tris-maleate buffer solution (100 ml.) of pH 5.6 and the above-prepared enzyme source (50 ml.) was kept at 37° for 15 minutes, whereupon 38.8% of the 2,6-diaminopurine was converted into 2,6-diaminopurine ribonucleoside.

*Example 13*

In this example, the same enzyme source as prepared in Example 12 was used.

A mixture consisting of 5 mM. aqueous solution (0.5 ml.) of uridine, 5 mM. aqueous solution (0.2 ml.) of 2-aminopurine, 1 M-acetate buffer solution (0.1 ml.) of pH 5.75 (containing 10 mM. potassium dihydrogenphosphate) and the enzyme source (0.2 ml.) was kept at 37° for 120 minutes, whereupon 54% of the 2-aminopurine was converted into 2-aminopurine riboside.

*Example 14*

*Aerobacter aerogenes* (Kruse) Beijerinck (ATCC–9621) was cultivated at 28° overnight on a bouillon-agar slant containing 1% of glucose, and an ear-pick of the cells was inoculated in a culture medium (100 ml.) placed in a 500 ml.-conical flask; the medium having the same composition as used in Example 1. The cells were incubated at 28° for two days under shaking. Then, the culture broth was collected, washed with 0.8% aqueous sodium chloride solution, and suspended in distilled water (80 ml.) to prepare enzyme source.

A mixture consisting of 5 mM. aqueous solution (0.5 ml.) of uridine, 5 mM. aqueous solution (0.2 ml.) of a base illustrated in Table 5, 1 M acetate buffer solution (0.1 ml.) of pH 5.75 (containing 10 mM. potassium dihydrogenphosphate) and the above-prepared enzyme source (0.2 ml.) was kept at 37° for 120 minutes, and the conversion rate in percentage of the bases into the corresponding nucleosides was measured to obtain the result which is shown in Table 5.

TABLE 5

| Base | Conversion rate after 120 minutes (percent) |
|---|---|
| 2,6-diaminopurine | 87 |
| 6-mercaptopurine | 73 |
| Purine | 64 |
| Benzoyladenine | 42 |

*Example 15*

*Escherichia coli* var. *communior* (Topley et Wilson) Yale (ATCC–15389) was cultivated at 37° for two days on a bouillon-agar slant containing 1% of glucose, and an ear-pick of the cells was inoculated in a culture medium (100 ml.) placed in 500 ml.-conical flask; the medium having the same composition as used in Example 1. The cells were incubated at 28° for four days under shaking. The resulting culture broth was centrifuged to collect the cells. The cells were washed with 0.8% aqueous sodium chloride solution, and suspended in distilled water (40 ml.) to prepare an enzyme source.

A mixture consisting of 5 mM. aqueous solution (0.5 ml.) of uridine, 5 mM. aqueous solution (0.2 ml.) of kinetin, 1 M. of acetate buffer solution (0.1 ml.) of pH 5.75 (containing 10 mM. potassium dihydrogenphosphate) and the above-prepared enzyme source (0.2 ml.) was kept at 37° for 120 minutes, whereupon 90% of kinetin was converted into kinetin riboside.

*Example 16*

Each microorganism shown in Table 6 was cultivated at 28° overnight on a bouillon-agar slant containing 1% of glucose, and an ear-pick of the cells was inoculated in a culture medium (40 ml.) having the same composition as used in Example 1. The incubation was carried out at 28° for two days under shaking, and the cells were collected. The cells were washed with 0.8% aqueous sodium chloride solution, and suspended in distilled water (50 ml.) to prepare an enzyme source.

A mixture consisting of 5 mM. aqueous solution (1.0 ml.) of the purine base illustrated in Table 6, 5 mM. aqueous solution (2.5 ml.) of cytidine deoxyriboside, 0.5 M tris buffer solution (1.0 ml.) of pH 7.5 (containing 10 mM. phosphate buffer solution) and the above-prepared enzyme source (0.5 ml.) was kept at 37° for 60 minutes. After the reaction, the mixture was adjusted to pH 5.0 with acetic acid under ice-cooling, and the resulting precipitates were removed by centrifugation. To the supernatant (2 ml.) was added active charcoal (300 mg.), and the mixture was cooled with ice for one hour. The charcoal was collected by centrifugation, washed with water, and associated with 5% aqueous perchloric acid solution (3.0 ml.). The mixture was boiled for 60 minutes and then centrifuged to obtain the supernatant. The resulting precipitates were further washed with 5% aqueous perchloric acid solution, and the washing was combined with the above obtained supernatant. The conversion rate of each purine base into the corresponding deoxypurinenucleoside was determined by diphenylamine reaction followed by colorimetry to obtain the following result.

*Example 17*

In the same manner as in Example 16, a variety of purine base was reacted with uridine in place of cytidine deoxyriboside to obtain the result as shown in Table 7, wherein the capital letters designate the respective microorganisms as referred to in Tables 6(a) and 6(b).

TABLE 6(A)

| Microorganism | Conversion rate (percent) from— | | | |
|---|---|---|---|---|
| | 6-chloropurine | 6-iodopurine | 6-methylaminopurine | Isoguanine |
| (A) *Aerobacter aerogenes* (Kruse) Beijerinck (ATCC-9621) | 84 | 81.5 | 71.5 | 27.5 |
| (B) *Erwinia aroideae* (Townsend) Holland (ATCC-15390) | 10.5 | 10 | 11.5 | 55 |
| (C) *Pseudomonas putrefaciens* (D. et H.) Long et Hammer (ATCC-8071) | 88 | 79 | 77.5 | 29.5 |
| (D) *Vibrio percolans* Mudd et Warren (NRRL, S-31) | 77 | 78 | 76 | — |
| (E) *Aeromonas hydrophila* (Chester) Stanier (NRRL, B-909) | 57.5 | 54 | 62.5 | — |
| (F) *Bacillus brevis* Migula emend. Ford (ATCC-9999) | 27.5 | 31 | 38 | — |
| (G) *Bacillus sphaericus* Neide (USDA-344) | 43 | 41.5 | 47 | — |
| (H) *Bacterium cadaveris* (ATCC-9760) | 54 | 55 | 18 | — |
| (I) *Corynebacterium sepedonicum* (Sp. et K.) Skaptason et Burkholder (ATCC-15391) | 28 | 29 | 40 | — |

Remark: "—" means "not tested."

TABLE 6(B)

| Conversion rate (percent) from: | Microorganism | | | | |
|---|---|---|---|---|---|
| | (E) | (F) | (G) | (H) | (I) |
| 6-mercaptopurine | 43 | 41 | 62 | 61 | 48 |
| Purine | 82 | 48 | 73 | 80 | 49 |
| 2-aminopurine | 68 | 42 | 71 | 68 | 46 |
| 2,6-diaminopurine | 59 | 42 | 70 | 62 | 47 |
| Kinetin | 81 | 50 | 75 | 72 | 38 |
| Benzoyladenine | 50 | 36 | 42 | 44 | 24 |

TABLE 7

| Conversion rate (percent) from— | Microorganism | | | | | | | | |
|---|---|---|---|---|---|---|---|---|---|
| | (A) | (B) | (C) | (D) | (E) | (F) | (G) | (H) | (I) |
| 6-chloropurine | 72 | 43 | 82 | 75 | 64 | 32 | 52 | 50 | 25 |
| 6-iodopurine | 68 | 40 | 78 | 75 | 58 | 32 | 54 | 54 | 27 |
| 6-methylaminopurine | 52 | 35 | 75 | 72 | 60 | 40 | 50 | 20 | 38 |
| Isoguanine | 28 | 52 | 29 | — | — | — | — | — | — |
| 6-mercaptopurine | — | — | — | — | 75 | 32 | 68 | 58 | 41 |
| Purine | — | — | — | — | 89 | 58 | 75 | 72 | 52 |
| 2-aminopurine | — | — | — | — | 87 | 55 | 77 | 62 | 48 |
| 2,6-diaminopurine | — | — | — | — | 78 | 49 | 72 | 59 | 45 |
| Kinetin | — | — | — | — | 91 | 57 | 78 | 72 | 40 |
| Benzoyladenine | — | — | — | — | 42 | 37 | 44 | 42 | 22 |

Remark: "—" means "not tested."

Having thus disclosed the invention, what is claimed is:

1. A process for producing artificial purine-nucleosides, which comprises bringing a purine base represented by the formula:

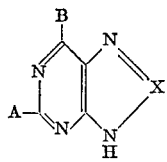

wherein A stands for a member selected from the group consisting of H, —OH and —NH$_2$, B stands for a member selected from the group consisting of H, a halogen, —SH, —NR$_2$, —NH-(lower alkyl),

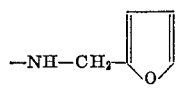

and —NH-acyl, X stands for a member selected from the group consisting of CH and N with the proviso that X is not CH when A and B are H and —NH$_2$, respectively, the lower alkyl having up to six carbon atoms, and the acyl being a lower carboxylic acid acyl having up to seven carbon atoms, into contact with a pentosyl group donor selected from the group consisting of naturally occurring purine-nucleosides, naturally occurring purine-nucleotides, pyrimidine-deoxyribonucleosides, pyrimidine-deoxyribonucleotides, pyrimidine-ribonucleosides and pyrimidine-ribonucleotides in an aqueous medium of pH between 4 and 10 at a temperature between 20° and 50° C. in the presence of inorganic phosphate and a pentosyl transferring enzyme system of an aerobic bacteria and recovering the objective purine-nucleosides thus accumulated in the reaction medium.

2. The process as claimed in claim 1, wherein the aerobic bacteria are those of a species selected from the group consisting of the genera Aerobacter, Aeromonas, Bacillus, Bacterium, Corynebacterium, Erwinia, Escherichia, Proteus, Pseudomonas, Salmonella, Serratia and Vibrio.

3. The process as claimed in claim 1, wherein the aerobic bacteria are those of *Aerobacter aerogenes* (Kruse) Beijerinck.

4. The process as claimed in claim 1, wherein the aerobic bacteria are those of *Aeromonas hydrophila* (Chester) Stanier.

5. The process as claimed in claim 1, wherein the aerobic bacteria are those of *Bacillus brevis* Migula emend. Ford.

6. The process as claimed in claim 1, wherein the aerobic bacteria are those of *Bacillus sphaericus* Neide.

7. The process as claimed in claim 1, wherein the aerobic bacteria are those of *Bacterium cadaveris* Gale et Epps.

8. The process as claimed in claim 1, wherein the aerobic bacteria are those of *Corynebacterium sepedonicum* (Spiek. et Kott.) Skaptason et Burkholder.

9. The process as claimed in claim 1, wherein the aerobic bacteria are those of *Erwinia Aroideae* (Townsend) Holland.

10. The process as claimed in claim 1, wherein the aerobic bacteria are those of *Escherichia coli* var. *communior* (Topley et Wilson) Yale.

11. The process as claimed in claim 1, wherein the aerobic bacteria are those of *Pseudomonas putrefaciens* (Derby et Hammer) Long et Hammer.

12. The process as claimed in claim 1, wherein the aerobic bacteria are those of *Vibrio percolans* Mudd et Warren.

13. The process as claimed in claim 1, wherein the concentration of the inorganic phosphate in the reaction medium is about from 0.1 to 500 millimolar concentration.

References Cited by the Examiner

UNITED STATES PATENTS 3,135,666   6/1964   Hara et al. _____ 195—28

FOREIGN PATENTS 672,274   10/1963   Canada.

A. LOUIS MONASELL, *Primary Examiner.*

ALVIN E. TANENHOLTZ, *Examiner.*